United States Patent
Baldwin et al.

(10) Patent No.: US 8,204,052 B2
(45) Date of Patent: Jun. 19, 2012

(54) METHODS, SYSTEMS, AND COMPUTER PROGRAM PRODUCTS FOR DYNAMICALLY COORDINATING COLLECTION AND DISTRIBUTION OF PRESENCE INFORMATION

(75) Inventors: Patricia A. Baldwin, Raleigh, NC (US); Seetharaman Khadri, Cary, NC (US); David M. Sprague, Raleigh, NC (US)

(73) Assignee: Tekelec, Inc., Morrisville, NC (US)

( * ) Notice: Subject to any disclaimer, the term of this patent is extended or adjusted under 35 U.S.C. 154(b) by 992 days.

(21) Appl. No.: 11/120,324

(22) Filed: May 2, 2005

(65) Prior Publication Data
US 2006/0246880 A1    Nov. 2, 2006

(51) Int. Cl.
*H04L 12/28* (2006.01)
*H04L 12/56* (2006.01)

(52) U.S. Cl. .................................. 370/389; 370/401
(58) Field of Classification Search ............... 370/395.2, 370/401; 455/403, 414.1, 435.1, 419, 513, 455/566
See application file for complete search history.

(56) References Cited

U.S. PATENT DOCUMENTS

| | | | |
|---|---|---|---|
| 5,341,680 A | 8/1994 | Smart et al. | |
| 5,579,371 A | 11/1996 | Aridas et al. | |
| 5,610,969 A | 3/1997 | McHenry et al. | |
| 5,774,668 A | 6/1998 | Choquier et al. | |
| 5,812,639 A | 9/1998 | Bartholomew et al. | |
| 5,999,525 A | 12/1999 | Krishnaswamy et al. | |
| 6,091,957 A | 7/2000 | Larkins et al. | |
| 6,091,959 A | 7/2000 | Souissi et al. | |
| 6,094,573 A | 7/2000 | Heinonen et al. | |
| 6,115,754 A | 9/2000 | Landgren | |
| 6,119,014 A | 9/2000 | Alperovich et al. | |
| 6,122,510 A | 9/2000 | Granberg | |
| 6,125,177 A | 9/2000 | Whittaker | |
| 6,128,304 A | 10/2000 | Gardell et al. | |
| 6,134,314 A | 10/2000 | Dougherty et al. | |
| 6,134,432 A | 10/2000 | Holmes et al. | |
| 6,181,937 B1 | 1/2001 | Joensuu | |
| 6,215,790 B1 | 4/2001 | Voit et al. | |
| 6,219,551 B1 | 4/2001 | Hentilä et al. | |
| 6,252,952 B1 | 6/2001 | Kung et al. | |
| 6,301,609 B1 | 10/2001 | Aravamudan et al. | |

(Continued)

FOREIGN PATENT DOCUMENTS
EP    1 511 267 A1    3/2005
(Continued)

OTHER PUBLICATIONS

Commonly-assigned, co-pending U.S. Appl. No. 11/077,711 for "Methods, Systems, and Computer Program Products for Providing Presence Gateway Functionality in a Telecommuniction Network," (Unpublished, filed Mar. 11, 2005).

(Continued)

*Primary Examiner* — Chirag Shah
*Assistant Examiner* — Minh-Trang Nguyen
(74) *Attorney, Agent, or Firm* — Jenkins, Wilson, Taylor & Hunt, P.A.

(57) ABSTRACT

Methods, systems, and computer program products for dynamically coordinating collection and distribution of presence information are disclosed. According to one method, presence information is collected for a presentity. An event manager is selected from a plurality of event managers and is dynamically assigned to the presentity. The presence information is then communicated to the assigned event manager.

36 Claims, 13 Drawing Sheets

U.S. PATENT DOCUMENTS

| | | | |
|---|---|---|---|
| 6,304,565 B1 | 10/2001 | Ramamurthy | |
| 6,324,183 B1 | 11/2001 | Miller et al. | |
| 6,333,931 B1 | 12/2001 | LaPier et al. | |
| 6,363,411 B1 | 3/2002 | Dugan et al. | |
| 6,373,930 B1 | 4/2002 | McConnell et al. | |
| 6,424,647 B1 | 7/2002 | Ng et al. | |
| 6,430,176 B1 | 8/2002 | Christie, IV | |
| 6,446,127 B1 | 9/2002 | Schuster et al. | |
| 6,453,034 B1 | 9/2002 | Donovan et al. | |
| 6,456,845 B1 | 9/2002 | Drum et al. | |
| 6,470,179 B1 | 10/2002 | Chow et al. | |
| 6,515,997 B1 | 2/2003 | Feltner et al. | |
| 6,564,261 B1 | 5/2003 | Gudjonsson et al. | |
| 6,571,094 B1 | 5/2003 | Begeja et al. | |
| 6,611,516 B1 | 8/2003 | Pirkola et al. | |
| 6,639,981 B1 | 10/2003 | Dunn, Jr. et al. | |
| 6,704,287 B1 | 3/2004 | Moharram | |
| 6,718,178 B1 | 4/2004 | Sladek et al. | |
| 6,747,970 B1 | 6/2004 | Lamb et al. | |
| 6,760,343 B1 | 7/2004 | Krishnamurthy et al. | |
| 6,968,052 B2 | 11/2005 | Wullert, II | |
| 7,039,040 B1 | 5/2006 | Burg | |
| 7,058,036 B1 | 6/2006 | Yu et al. | |
| 7,146,181 B2 | 12/2006 | Schaedler et al. | |
| 7,209,968 B1* | 4/2007 | Secer | 709/226 |
| 7,260,207 B2 | 8/2007 | Marsico | |
| 7,701,925 B1 | 4/2010 | Mason et al. | |
| 7,907,713 B2 | 3/2011 | Khadri | |
| 7,933,608 B2 | 4/2011 | Tejani et al. | |
| 2001/0031641 A1 | 10/2001 | Ung et al. | |
| 2001/0034224 A1 | 10/2001 | McDowell et al. | |
| 2002/0058507 A1 | 5/2002 | Valentine et al. | |
| 2002/0061746 A1* | 5/2002 | Jo et al. | 455/433 |
| 2002/0078209 A1* | 6/2002 | Peng | 709/227 |
| 2002/0086672 A1 | 7/2002 | McDowell et al. | |
| 2002/0187781 A1 | 12/2002 | Furlong | |
| 2002/0193127 A1 | 12/2002 | Martschitsch | |
| 2003/0026289 A1 | 2/2003 | Mukherjee et al. | |
| 2003/0031160 A1 | 2/2003 | Gibson Ang et al. | |
| 2003/0073440 A1* | 4/2003 | Mukherjee et al. | 455/435 |
| 2003/0100326 A1 | 5/2003 | Grube et al. | |
| 2003/0148779 A1 | 8/2003 | Aravamudan et al. | |
| 2003/0177281 A1 | 9/2003 | McQuillan et al. | |
| 2003/0235180 A1 | 12/2003 | Oprescu-Surcobe et al. | |
| 2004/0003037 A1 | 1/2004 | Fukimoto et al. | |
| 2004/0015569 A1 | 1/2004 | Lonnfors et al. | |
| 2004/0047303 A1 | 3/2004 | Fernandez et al. | |
| 2004/0062383 A1 | 4/2004 | Sylvain | |
| 2004/0125790 A1 | 7/2004 | Hiller et al. | |
| 2004/0133641 A1* | 7/2004 | McKinnon et al. | 709/204 |
| 2004/0153506 A1 | 8/2004 | Ito et al. | |
| 2004/0193686 A1 | 9/2004 | Blagsvedt et al. | |
| 2004/0203923 A1 | 10/2004 | Mullen | |
| 2005/0027867 A1 | 2/2005 | Mueller et al. | |
| 2005/0050157 A1 | 3/2005 | Day | |
| 2005/0070310 A1 | 3/2005 | Caspi et al. | |
| 2005/0074101 A1 | 4/2005 | Moore et al. | |
| 2005/0091387 A1* | 4/2005 | Abe | 709/228 |
| 2005/0136952 A1 | 6/2005 | Zabawskyj et al. | |
| 2005/0143111 A1 | 6/2005 | Fitzpatrick et al. | |
| 2005/0143135 A1 | 6/2005 | Brems et al. | |
| 2005/0164682 A1 | 7/2005 | Jenkins et al. | |
| 2005/0202836 A1 | 9/2005 | Schaedler et al. | |
| 2005/0228895 A1* | 10/2005 | Karunamurthy et al. | 709/229 |
| 2005/0266859 A1 | 12/2005 | Tejani et al. | |
| 2006/0112177 A1 | 5/2006 | Barkley et al. | |
| 2006/0140189 A1* | 6/2006 | Wu et al. | 370/395.2 |
| 2007/0127676 A1 | 6/2007 | Khadri | |
| 2010/0017472 A1 | 1/2010 | Benedyk et al. | |
| 2010/0137002 A1 | 6/2010 | Agarwal et al. | |
| 2010/0205248 A1 | 8/2010 | Mason et al. | |

FOREIGN PATENT DOCUMENTS

| | | |
|---|---|---|
| EP | 1 269 765 | 7/2008 |
| JP | 2005057709 | 3/2005 |
| WO | WO 99/14910 | 3/1999 |
| WO | WO 00/35155 | 6/2000 |
| WO | WO 01/45342 A2 | 6/2001 |
| WO | WO 01/56308 | 8/2001 |
| WO | WO 01/72055 A2 | 9/2001 |
| WO | WO 03/032616 A1 | 4/2003 |
| WO | WO 2005/086966 A2 | 9/2005 |
| WO | WO 2005/086972 A2 | 9/2005 |
| WO | WO 2007/050591 A2 | 5/2007 |
| WO | WO 2008/036645 A2 | 3/2008 |

OTHER PUBLICATIONS

Campbell et al., "SIP Instant Message Sessions," p. 1 (Jun. 30, 2003).

Campbell et al., "Session Initiation Protocol (SIP) Extension for Instant Messaging," pp. 1-15 (Dec. 2002).

Day et al., "Instant Messaging/Presence Protocol Requirements," pp. 1-20 (Feb. 2000).

Day et al., "A Model for Presence and Instant Messaging," pp. 1-13 (Feb. 2000).

"3$^{rd}$ Generation Partnership Project; Technical Specification Group Services and Systems Aspects; Network Architecture (Release 5)," 3GPP TS 23.002, V5.7.0, p. 1-50, (Jun. 2002).

Commonly-assigned, co-pendng U.S. Appl. No. 09/627,253 for "Presence Registration and Routing Node," (Unpublished, filed Jul. 28, 2000).

Sugano et al., "Presence Information Data Format for IMPP," Internet draft, draft-ietf-impp-pidf-01.txt, Network Working Group, p. 1-17, (Mar. 10, 2000).

Aggarwal et al., "Transport Protocol for Presence Information / Instant Messaging," Internet draft, draft-ietf-impp-pitp-mitp-01, Network Working Group, p. 1-21, (Mar. 9, 2000).

Stracke, "Message Information Data Format," Internet draft, draft-ietf-impp-midf-01.txt, Network Working Group, p. 1-4, (Jan. 19, 2000).

Tekelec, "IP$^7$ Secure Gateway Release 1.0", Tekelec Release Documentation, 910-2046-01 Revision A (Nov. 1999).

Handley et al., "SIP: Session Initiation Protocol," Request for Comments: 2543, Network Working Group, p. 1-111, (Mar. 1999).

Handley et al., "SDP: Session Description Protocol," Request for Comments: 2327, Network Working Group, p. 1-42, (Apr. 1998).

Tekelec, "Feature Guide Eagle STP," P/N 910-1225-01 Revision B (Jan. 1998).

Tekelec, "Feature Guide LNP LSMS," P/N 910-1598-01 Revision A (Jan. 1998).

Notification of Transmittal of the international Search Report and the Written Opinion of the International Searching Authority, or the Declaration for International Application No. PCT/US06/13404 (Oct. 5, 2007).

Ex parte Quayle for U.S. Appl. No. 09/627,253 (May 7, 2009).

Communication regarding the expiry of the time limit within which notice of opposition may be filed for European Application No. 01920654.9 dated May 7, 2009.

Official Action for U.S. Appl. No. 11/586,423 (Apr. 29, 2009).

Final Official Action for U.S. Appl. No. 11/077,711 (Mar. 16, 2009).

Notice of Abandonment for U.S. Appl. No. 09/627,253 (Nov. 12, 2008).

Office Action for U.S. Appl. No. 11/586,423 (Jul. 25, 2008).

Office Action for U.S. Appl. No. 11/077,711 (Jun. 26, 2008).

Notification of Transmittal of the International Search Report and the Written Opinion of the International Searching Authority, or the Declaration for International Application No. PCT/US06/41451 (Jul. 7, 2008).

Final Official Action for U.S. Appl. No. 09/627,253 (Apr. 4, 2008).

Official Action for U.S. Appl. No. 09/627,253 (Sep. 20, 2007).

Restriction/Election Requirement for U.S. Appl. No. 09/627,253 (Jun. 14, 2007).

Communication pursuant to Article 96(2) EPC corresponding to European Application No. 01 920 654.9 dated May 2, 2007.

Notice of Panel Decision for U.S. Appl. No. 09/627,253 (Apr. 2, 2007).

Notice of Allowance and Fee(s) Due for U.S. Appl. No. 10/798,924 (Oct. 3, 2006).

Official Action for U.S. Appl. No. 09/627,253 (Aug. 25, 2006).

Notification of Transmittal of the International Search Report and the Written Opinion of the International Searching Authority, or the Declaration for International Application No. PCT/US05/08258 (Aug. 16, 2006).
Notification of Transmittal of the International Search Report and the Written Opinion of the International Searching Authority, or the Declaration for International Application No. PCT/US05/08307 (Mar. 13, 2006).
Official Action for U.S. Appl. No. 10/798,924 (Feb. 23, 2006).
Advisory Action for U.S. Appl. No. 09/627,253 (Dec. 28, 2005).
Final Official Action for U.S. Appl. No. 09/627,253 (Jun. 2, 2005).
Notification of Transmittal of the International Search Report and the Written Opinion of the International Searching Authority, or Declaration for International Application No. PCT/US05/08307 (Mar. 11, 2005).
Official Action for U.S. Appl. No. 09/627,253 (May 19, 2004).
Restriction/Election Requirement for U.S. Appl. No. 09/627,253 (Jan. 9, 2004).
Official Action for U.S. Appl. No. 09/627,253 (Apr. 28, 2003).
Interview Summary for U.S. Appl. No. 09/627,253 (Jan. 30, 2003).
Notice of Allowance and Fee(s) Due for U.S. Appl. No. 09/627,253 (Jul. 24, 2009).
Commonly-assigned, co-pending U.S. Appl. No. 12/484,857 for "Methods, Systems, and Computer Readable Media for Providing Presence Data From Multiple Presence Information Providers," (Unpublished, filed Jun. 15, 2009).
Interview Summary for U.S. Appl. No. 11/077,711 (Dec. 21, 2010).
Notice of Allowance and Fee(s) Due for U.S. Appl. No. 11/077,711 (Dec. 20, 2010).
Interview Summary for U.S. Appl. No. 11/077,711 (Dec. 3, 2010).
Notice of Allowance and Fee(s) Due for U.S. Appl. No. 11/586,423 (Oct. 6, 2010).
European Search Report for European application No. 06826548.7 (Sep. 3, 2010).
Final Official Action for U.S. Appl. No. 11/077,711 (Jun. 23, 2010).
Communication purusant to Article 94(3) EPC for European application No. 08153801.9 (May 28, 2010).
Official Action for U.S. Appl. No. 12/762,908 (Apr. 14, 2011).
Chinese Offical Action for Chinese Patent Application No. 200680049126.1 (Feb. 24, 2011).
Supplemental Notice of Allowability for U.S. Appl. No. 11/077,711 (Feb. 16, 2011).
Supplementary European Search Report for European application No. 05725442.7 (Aug. 16, 2011).
Interview Summary for U.S. Appl. No. 12/762,908 (Jun. 28, 2011).
Interview Summary for U.S. Appl. No. 11/586,423 (Oct. 15, 2009).
European Search Report for European application No. 08153801.9 (Jan. 27, 2010).
Official Action for U.S. Appl. No. 11/586,423 (Jan. 6, 2010).
Official Action for U.S. Appl. No. 11/077,711 (Dec. 24, 2009).
Commonly-assigned, co-pending U.S. Appl. No. 12/624,974 for "Methods, Systems, and Computer Readable Media for Providing Geo-Location Proximity Updates to a Presence System," (Unpublished, filed Nov. 24, 2009).
Wideberg et al., "Deriving Traffic Data From a Cellular Network," World Congress on Intelligent Transport System and Services. World Congress on Intelligent Transport System and Services (13). Num. 13. Londres, UK. Ertico. (2006).
Klyne, et al., "Common Presence and Instant Messaging (CPIM): Message," Network Working Group, RFC 3862, p. 1-23 (Aug. 2004).
Peterson, J., "Common Profile for Instant Messaging (CPIM)," Network Working Group, RFC 3860 (Aug. 2004).
Rosenberg et al., "SIP: Session Initiation Protocol," Network Working Group, FRC 3261 (Jun. 2002).
Saraswat et al., "The Presence Protocol," Internet-Draft, draft-saraswat-presenceprotocol-00.txt, p. 1-15 (Feb. 26, 1999).
Rosenberg et al., "SIP for Presence," IETF, draft-rosenberg-sip-pip-00.txt, p. 1-22 (Nov. 13, 1998).
Commonly assigned, co-pending U.S. Divisional Patent Application for "Presence Registration and Routing Node," (Unpublished, filed Apr. 19, 2010).
Interview Summary for U.S. Appl. No. 11/077,711 (Mar. 4, 2010).
Notification of Transmittal of the International Search Report and the Written Opinion of the International Searching Authority, or the Declaration of PCT/US2009/047391 (Jan. 25, 2010).
Applicant-Initiated Interview Summary for U.S. Appl. No. 12/762,908 (Jan. 9, 2012).
Second Office Action of Chinese Patent Application No. 200680049126.1 (Dec. 6, 2011).
Final Official Action for U.S. Appl. No. 12/762,908 (Nov. 9, 2011).
Extended European Search Report for European Application No. 09763799.5 (Oct. 14, 2011).

* cited by examiner

METHODS, SYSTEMS, AND COMPUTER PROGRAM PRODUCTS FOR DYNAMICALLY COORDINATING COLLECTION AND DISTRIBUTION OF PRESENCE INFORMATION

TECHNICAL FIELD

The subject matter described herein relates to collecting and distributing presence information. More particularly, the subject matter described herein relates to methods, systems, and computer program products for dynamically coordinating collection and distribution of presence information.

BACKGROUND ART

Presence information is increasingly being collected in telecommunications networks in order to provide value-added services to telecommunications subscribers. Presence information refers to information regarding the reachability, location, communication terminal status, preferred contact mode, available contact modes, and/or other aspects associated with contacting a telecommunications subscriber. Such information may be collected so that an application or another subscriber can contact and communicate with the subscriber.

The subscriber about whom presence information is being collected is referred to as a presentity. Presence information regarding the presentity is stored by a presence server. When another subscriber or application seeks to contact the presentity, the subscriber or application subscribes to the presentity by sending a subscription message to the presence server. Once the presence server accepts the subscription, the presence server will communicate presence information regarding the presentity to the subscriber or application. When the status of the presentity changes, the presence server will automatically communicate changes in status to the subscribing application or subscriber.

In 3 G communications networks, end user devices, such as GPRS handsets, include presence clients that automatically maintain presence information for subscribers and communicate the presence information to a presence server. In 2 G and 2.5 G networks, end user devices are typically not capable of maintaining or communicating presence information to a presence server. However, since 2 G and 2.5 G network subscribers represent a large percentage of subscribers, it is desirable to collect or derive presence information regarding these subscribers. Commonly-assigned, co-pending U.S. patent application Ser. No. 11/077,711 filed Mar. 11, 2005, the disclosure of which is incorporated herein by reference in its entirety, discloses a presence gateway that automatically derives presence information regarding subscribed-to and non-subscribed-to presentities and delivers the information to a presence server. The presence gateway includes a correlator that correlates signaling messages and derives presence information and an event manager that receives the presence information from the correlator and sends the presence information to the presence server. The event manager receives subscriptions from the presence server and communicates changes in presence information for subscribed-to presentities to the presence server.

As applications that require presence information become increasingly popular, it is desirable to scale the presence gateway architecture to correlate presence information for increasingly large numbers of subscribers. In order to accommodate increasingly large numbers subscribers, multiple presence gateways with multiple correlators and multiple event managers may be used. One problem associated with using multiple correlators and multiple event managers is that the correlators and the presence servers must know the location of the event managers containing presence information for particular subscribers. One potential solution to the problem is to statically configure each correlator and presence server with a location of the event manager with presence information for each subscriber. Statically configuring the correlators and presence servers with the location of the presence information for each subscriber is cumbersome and requires manual re-provisioning as new subscribers are added to the network.

Accordingly, in light of the problems associated with collecting and distributing presence information, there exists a need for improved methods, systems, and computer program products for coordinating collection and distribution of presence information.

SUMMARY

According to one aspect, the subject matter described herein includes a method for dynamically coordinating collection and distribution of presence information. The method includes collecting presence information for a presentity. The presence information may include any of the types of presence information described above, signaling messages relating to communications involving the presentity, and/or signaling message parameters from which contact information may be derived for the presentity. A presence gateway event manager is dynamically assigned from a plurality of event managers to the presentity. Once the event manager is assigned, the presence information is transmitted to the assigned event manager.

According to another aspect of the subject matter described herein, a system for dynamically coordinating collection and distribution of presence information is disclosed. The system includes at least one correlator for receiving telecommunications signaling messages and for deriving presence information regarding a presentity from the signaling messages. In one example, the signaling messages comprise SS7 signaling messages regarding the presentity. A plurality of presence server event managers receives the presence information and communicates the presence information to a presence server. An event manager coordinator dynamically assigns one of the event managers to receive the presence information for the presentity. The event manager coordinator may also inform a presence server of the event manager assigned to the presentity in response to a subscription request regarding the presentity from the presence server.

The subject matter described herein can be implemented using hardware in combination with software or firmware. In one implementation, the subject matter described herein includes a computer program product comprising computer executable instructions embodied in a computer readable medium. Exemplary computer readable media suitable for implementing the subject matter described herein include memory devices, such as chip memory devices and disk storage devices, application specific integrated circuits, programmable logic devices, or any other medium capable of storing computer executable instructions or logic implementations thereof. In addition, a computer program product that implements all or a portion of the subject matter described herein may be distributed across multiple physical devices or network nodes.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
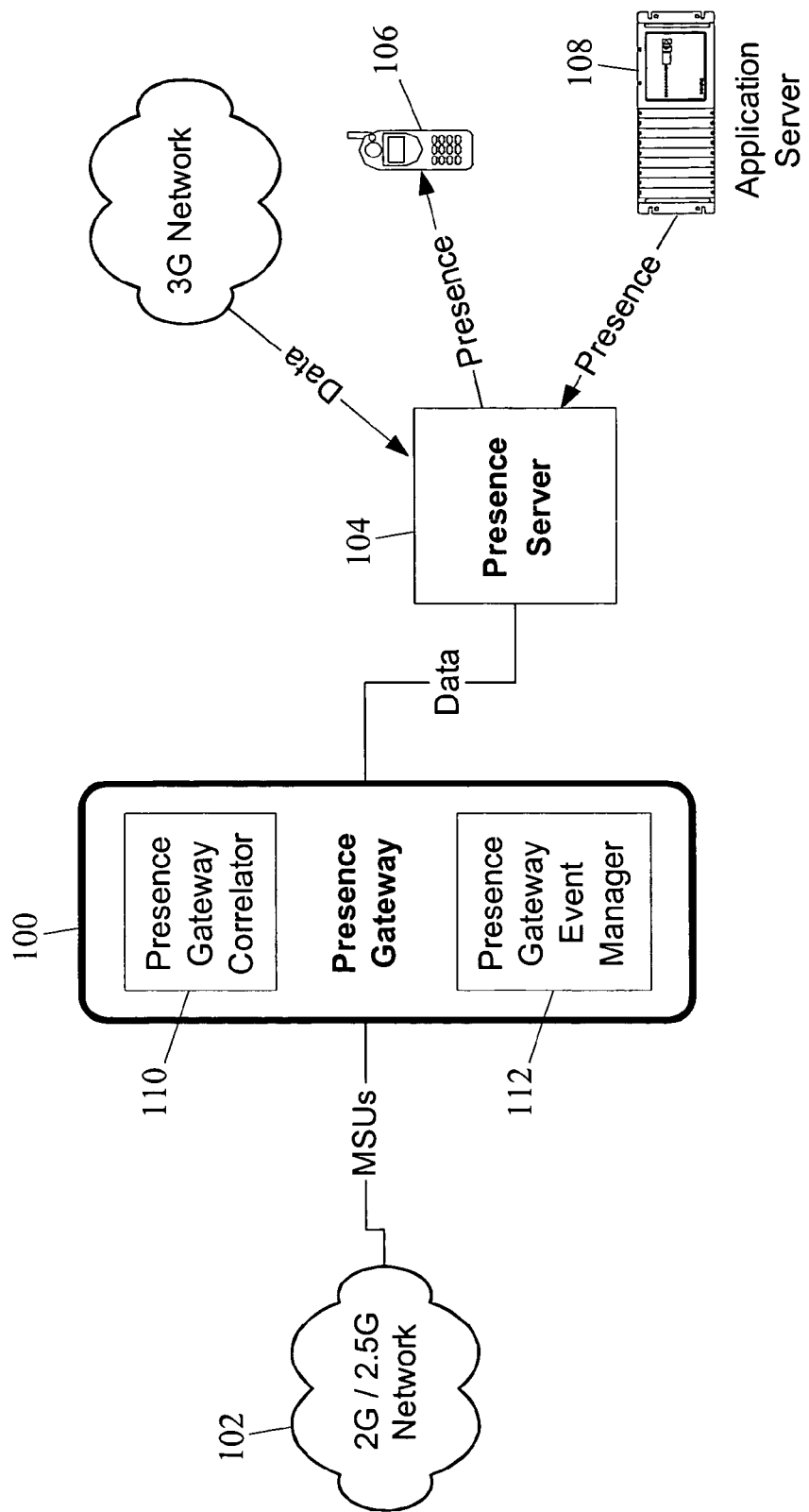
FIG. 1 is a network diagram illustrating an exemplary presence gateway architecture.

FIG. 1 is a network diagram illustrating a presence gateway that collects and distributes presence information. Referring to FIG. 1, presence gateway 100 receives messages from 2 G/2.5 G network 102 and delivers presence information to presence server 104. Presence server 104 delivers presence information to entities that subscribe to receive presence information, such as handset 106. Presence server 104 also receives presence information from an application server 108. In the illustrated example, presence gateway 100 includes a presence gateway correlator 110 for receiving the messages, correlating the messages, deriving presence information regarding subscribed-to and non-subscribed-to presentities, and generating presence information. Presence gateway event manager 112 receives the presence information and delivers the presence information to presence server 104.

Because presence information can be derived from many different signaling messages exchanged between different network elements, messages relating to a particular subscriber are preferably processed by the same event manager. One advantage of having a single event manager process presence information for a subscriber is that a complete presence profile can be deduced for a subscriber.

Figure 2:
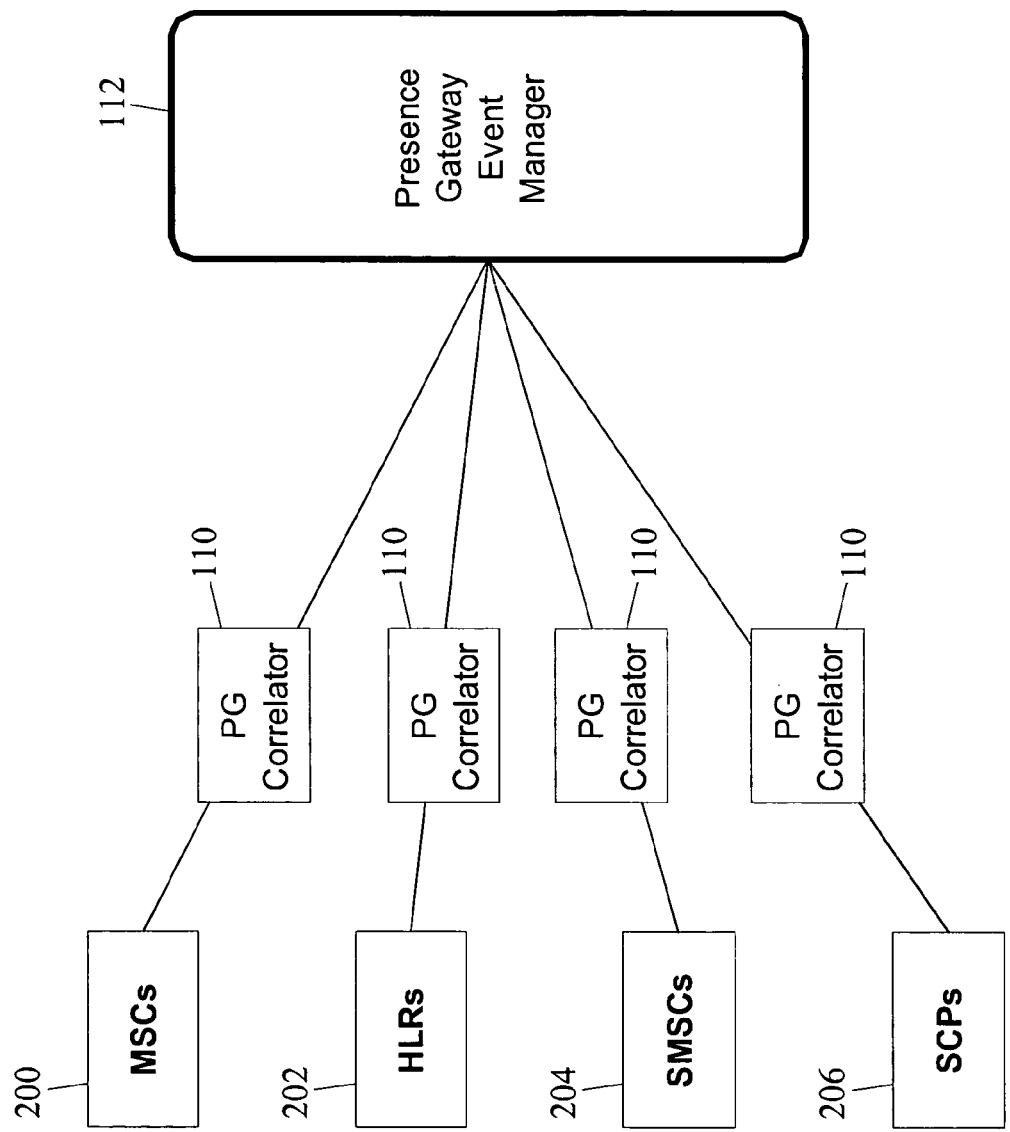
FIG. 2 is a network diagram illustrating a presence gateway architecture including a single presence gateway event manager.

FIG. 2 is a network diagram illustrating a single presence gateway event manager receiving messages from presence gateway correlators in different locations. In the illustrated example, presence gateway correlators 110 may be located at or near MSCs 200, HLRs 202, SMSCs 204, and SCPs 206. Presence gateway correlators 110 may be internal or external to the nodes that they monitor. In one exemplary implementation, presence gateway correlators 110 are located external to the nodes being monitored. Each node being monitored may have an internal or external message copy function that sends copies of signaling messages to presence gateway correlators 110.

Figure 3:
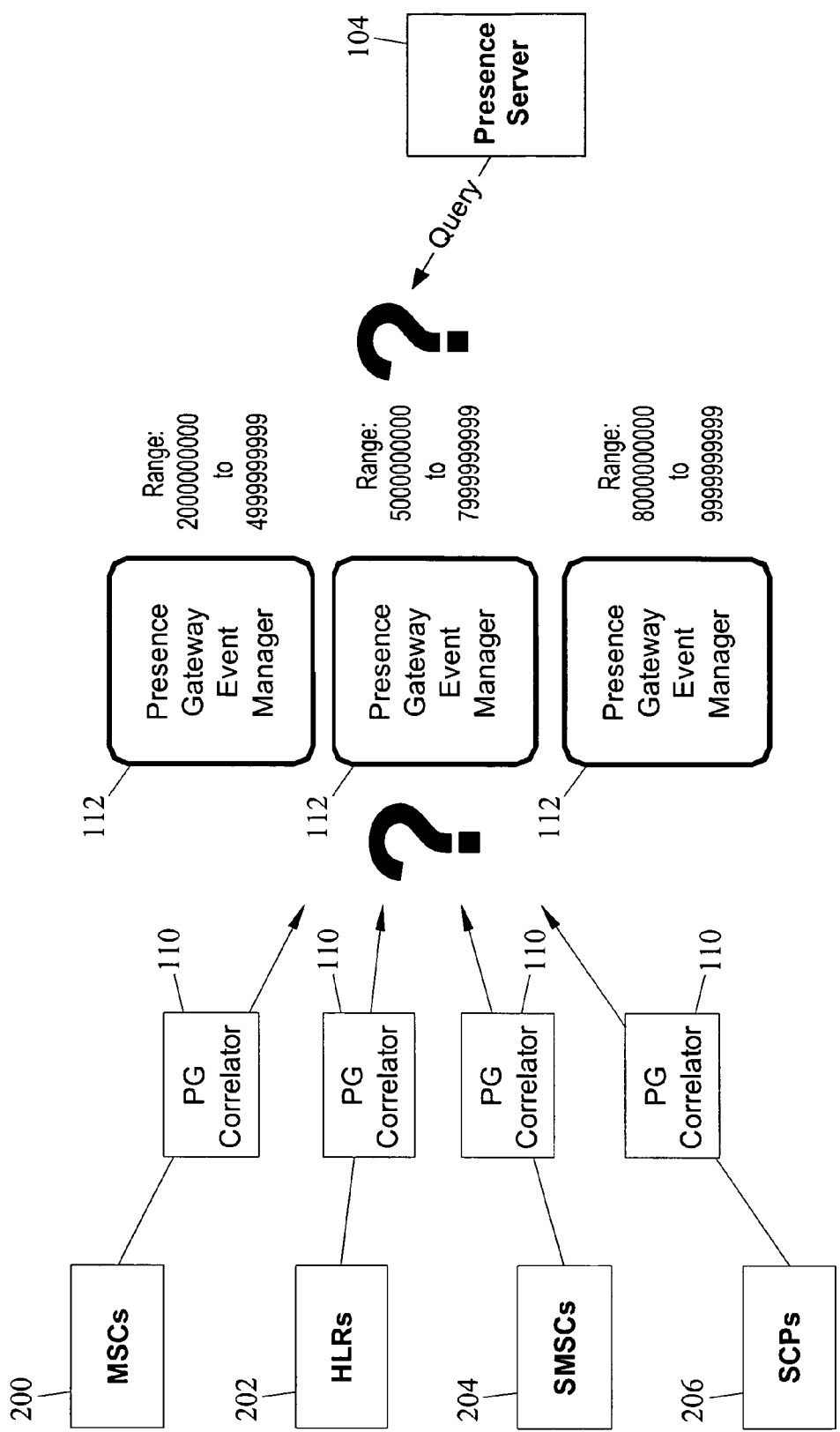
FIG. 3 is a network diagram illustrating multiple presence gateway event managers that are assigned pre-provisioned ranges of subscribers.

In large networks, it may be desirable to collect and distribute presence information for millions or tens of millions of subscribers. In order to scale presence gateway 100 to meet this demand, it may be desirable to add multiple event managers 112. FIG. 3 illustrates this architecture. In FIG. 3, presence gateway event managers 112 are each statically assigned to specific ranges of subscribers. The ranges of subscribers may correspond to subscriber identifiers, such as subscriber directory numbers. One problem with statically allocating ranges of subscribers to event managers is that periodic reallocation must be manually performed when the number of subscribers grows, when new subscriber numbers are added to a network, or when new event managers are added to a network. Accordingly, the approach for allocating subscribers to event managers using pre-provisioned directory number ranges illustrated in FIG. 3 is undesirable.

Figure 4:
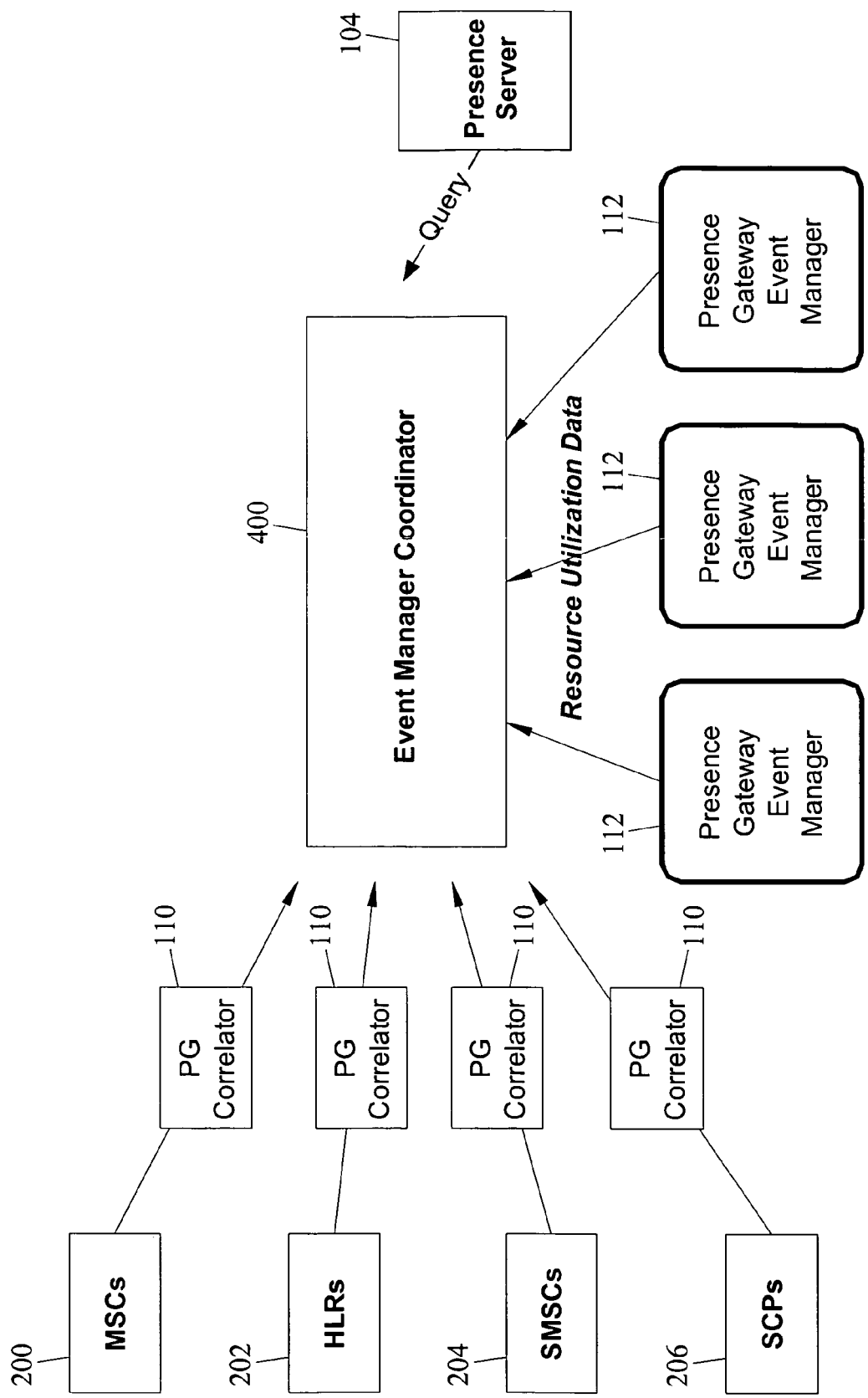
FIG. 4 is a network diagram illustrating a presence gateway architecture including an event manager coordinator according to an embodiment of the subject matter described herein.

According to an aspect of the subject matter described herein, an event manager coordinator dynamically assigns subscribers to event managers. FIG. 4 is a network diagram illustrating a presence gateway architecture including an event manager coordinator that dynamically assigns telecommunications network subscribers to presence gateway event managers according to an embodiment of the subject matter described herein. Referring to FIG. 4, event manager coordinator 400 receives resource utilization data from presence gateway event managers 112. Based on the resource utilization data, presence gateway event manager coordinator 400 dynamically assigns presence gateway event managers 112 to subscribers. For example, event manager coordinator 400 may receive requests from presence gateway correlators 110 for the location of event managers 112. If the subscriber is currently assigned to an event manager, event manager coordinator 400 will respond with the location of the event manager that currently holds the subscriber record. If the subscriber is not currently assigned to a particular event manager, event manager coordinator 400 may allocate an event manager based on the resource utilization data. Once presence gateway correlators 110 receive the location information for a subscriber record, presence gateway correlators 110 may send presence information directly to the event manager.

According to another aspect of the subject matter described herein, event manager coordinator 400 may allocate a presence gateway event manager 112 in response to receiving a subscription request from presence server 104. For example, if event manager coordinator 400 receives a subscription request from presence server 104, event manager coordinator 400 may respond with a location of the presence gateway event manager 112 currently assigned to the subscriber, if an event manager has been assigned. If an event manager has not been assigned, event manager coordinator 400 may dynamically allocate an event manager based on the resource utilization data and communicate the identity of the event manager to presence server 104.

Figure 5:
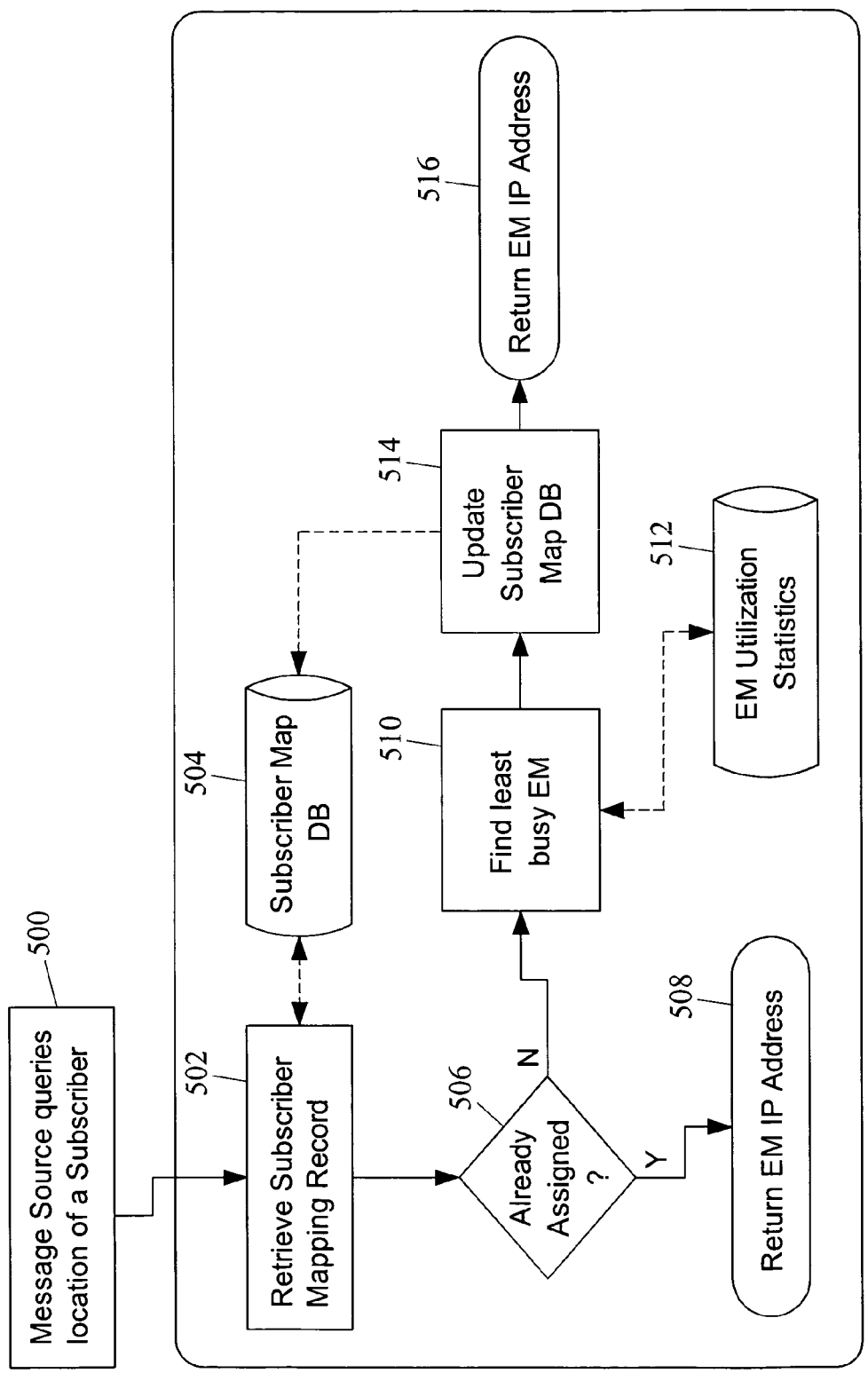
FIG. 5 is a flow chart illustrating exemplary steps for dynamically assigning a subscriber to an event manager based on a query from an MSU source according to an embodiment of the subject matter described herein.

FIG. 5 is a flow chart illustrating exemplary steps for dynamically assigning a subscriber to an event manager according to an embodiment of the subject matter described herein. Referring to FIG. 5, in step 500, a message source queries presence gateway coordinator 400 for the location of a subscriber record. The message source may be a message correlator 110. In step 502, event manager coordinator 400 retrieves a subscriber mapping record. The subscriber mapping record may indicate whether or not a subscriber is currently assigned to an event manager, and, if the subscriber has been assigned to an event manager, the identity of the event manager. The subscriber mapping record may be stored in subscriber mapping database 504.

In step 506, event manager coordinator 400 determines whether the subscriber has already been assigned to an event manager. If the subscriber has already been assigned to an event manager, control proceeds to step 508 where the assigned event manager IP address is returned.

If the subscriber has not already been assigned to an event manager, control proceeds to step 510 where the event manager that is least busy is located. This step may be performed by analyzing event manager utilization statistics 512. Once the least busy event manager is located, control proceeds to step 514 where that event manager is selected and the subscriber mapping database 504 is updated to reflect the newly assigned mapping. In step 516, event manager coordinator 400 returns the IP address of the newly assigned event manager.

Figure 6:
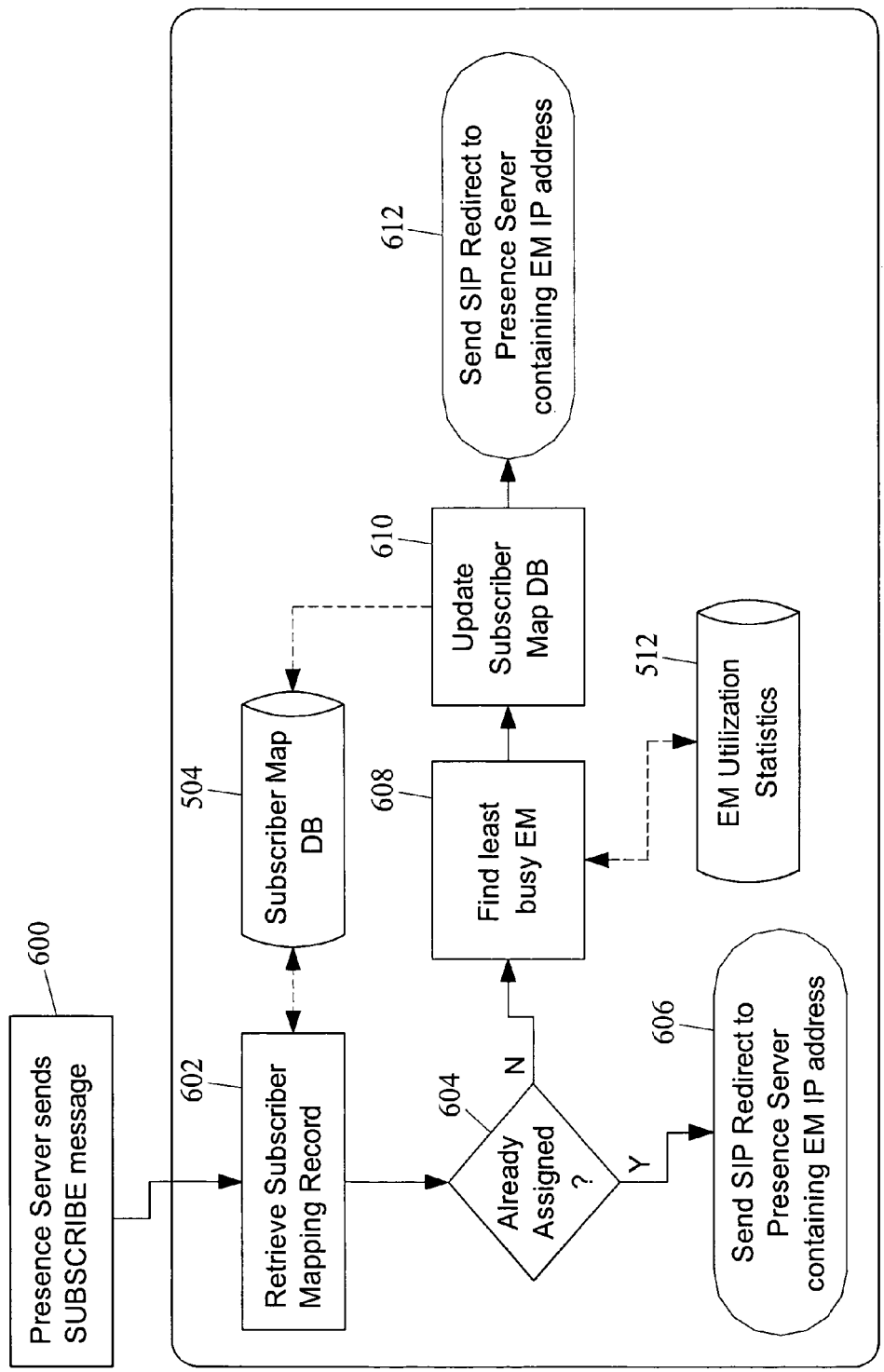
FIG. 6 is a flow chart illustrating exemplary steps for dynamically assigning a subscriber to an event manager based on a subscription attempt from a presence server according to an embodiment of the subject matter described herein.

As stated above, event managers may also be dynamically allocated when a presence server sends a subscription message for a particular subscriber. FIG. 6 is a flow chart illustrating dynamic event manager allocation based on a presence server subscription attempt according to an embodiment of the subject matter described herein. Referring to FIG. 6, in step 600, a presence server sends a subscribe message to event manager coordinator 400. In step 602, event manager coordinator 400 retrieves a subscriber mapping record from subscriber mapping database 504. In step 604, event manager coordinator 400 determines whether the subscriber is already assigned to an event manager. If the subscriber is already assigned to an event manager, control proceeds to step 606 where a SIP redirect message is sent to the presence server to redirect the presence server to the event manager containing the presence information for the subscriber.

In step 604, if the subscriber is not already assigned to an event manager, control proceeds to step 608 where event manager coordinator 400 locates the least busy event manager. In step 610, event manager coordinator 400 updates subscriber mapping database 504 with the event manager assigned to the subscriber. Control then proceeds to step 612 where a SIP redirect message containing the event manager IP address is sent to the presence server.

Once an event manager has been assigned to a presentity based on a presence server subscription request, as illustrated in FIG. 6, the steps illustrated in FIG. 5 may be performed to notify a message correlator of the event manager assigned to the presentity. That is, the correlator may query presence gateway coordinator 400 for the location or identity of the event manager assigned to a presentity, and presence gateway coordinator 400 may respond with the location of the event manager assigned based on the presence server subscription request.

Figure 7:
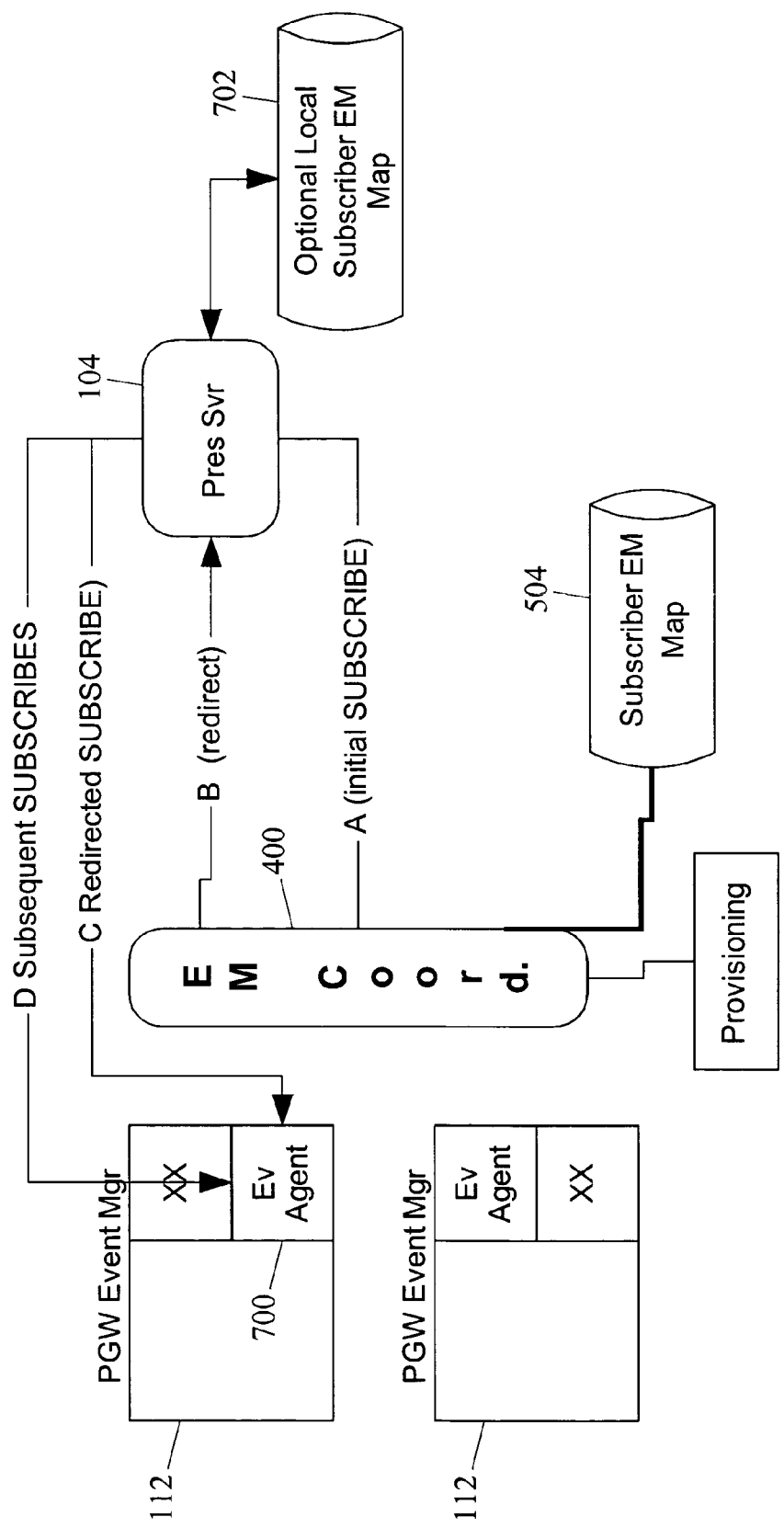
FIG. 7 is a network diagram illustrating exemplary messages exchanged between an event manager coordinator, a presence server, and presence gateway event manager in locating a presence gateway event manager assigned to a subscriber according to an embodiment of the subject matter described herein.

FIG. 7 is a network diagram illustrating exemplary messages exchanged between event manager coordinator 400 and a presence server in allocating a subscriber to an event manager in response to a subscribe message from a presence server. Referring to FIG. 7, in step A, presence server 104 sends a subscribe message to the IP address of event manager coordinator 400. In step B, event manager coordinator 400 redirects the subscribe message to the IP address of the appropriate event manager 112. As stated above, if the subscriber has not been previously assigned to an event manager, event manager coordinator 400 may dynamically assign an event manager based on event manager utilization information. If the subscriber has been assigned to an event manager, event manager coordinator may redirect presence server 104 to the appropriate event manager.

In step C, presence server 104 sends a redirected subscribe message to an event manager agent 700 of the assigned event manager 112. Presence server 104 may optionally cache the subscriber location returned by event manager coordinator 400. Subsequent subscribes to the same subscriber may be sent to the same presence gateway event manager 112, as indicated in step D.

Figure 8:
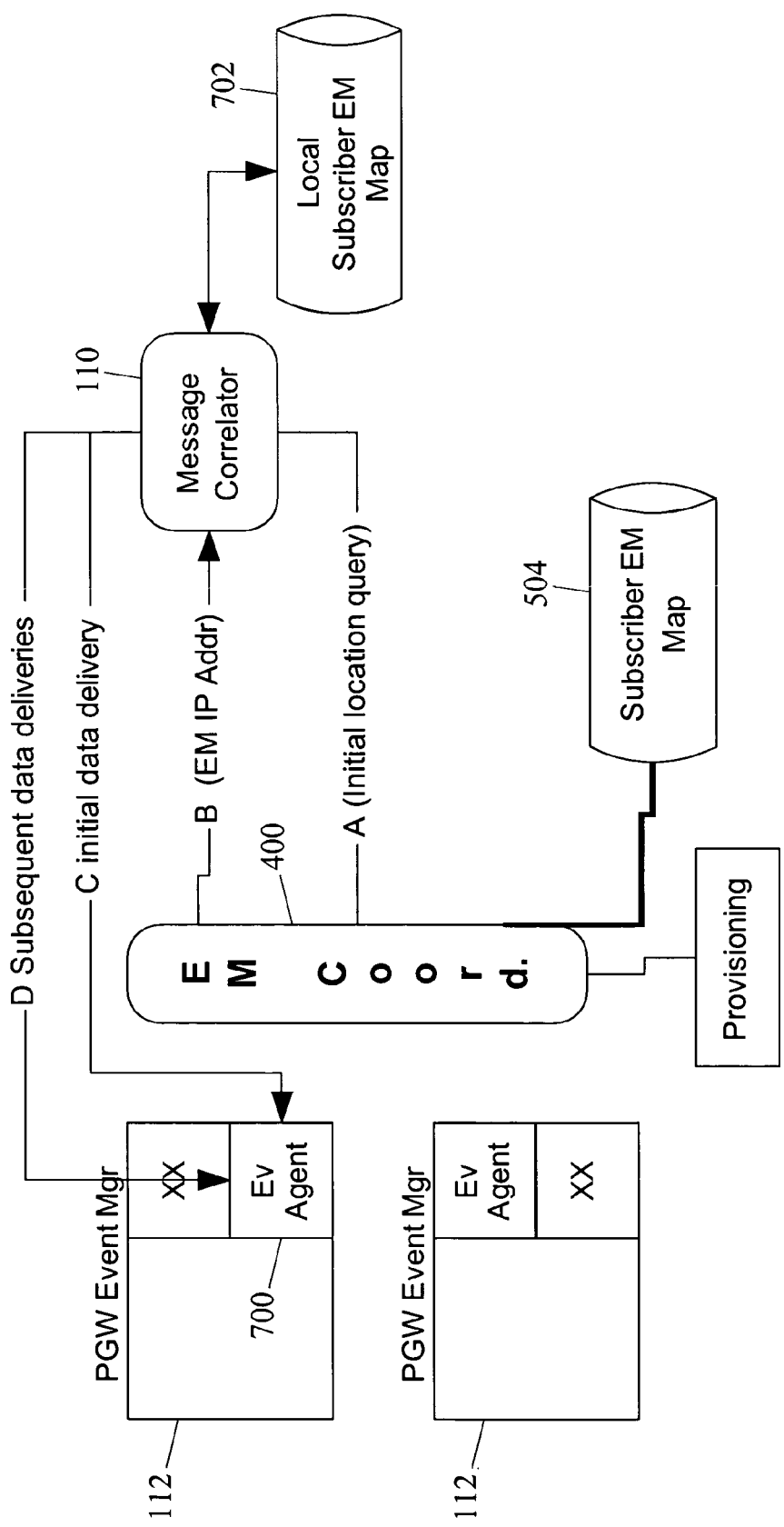
FIG. 8 is a network diagram illustrating exemplary messages exchanged between a message correlator, an event manager coordinator, and presence gateway event managers in locating a presence gateway event manager assigned to a subscriber according to an embodiment of the subject matter described herein.

As stated above, event manager coordinator 400 may dynamically allocate an event manager for a subscriber in response to the query from a message correlator. FIG. 8 illustrates exemplary messages that may be exchanged between event manager coordinator 400 and message correlator 110 in assigning an event manager to a particular subscriber. Referring to FIG. 8, in step A, message correlator 110 sends a location query message to event manager coordinator 400 requesting the location of a subscriber record. In step B, event manager coordinator 400 responds with an IP address of an event manager assigned to the subscriber. Once an event manager has been assigned, event manager coordinator 400 is no longer involved in communications between correlator 110 and the event manager.

In step C, correlator 110 delivers messages to the assigned event manager. In step D, subsequent data deliveries regarding the same subscriber may be sent directly from message correlator 110 to event manager 112 based on a local cache 702 of event manager information for the subscriber.

Figure 9:
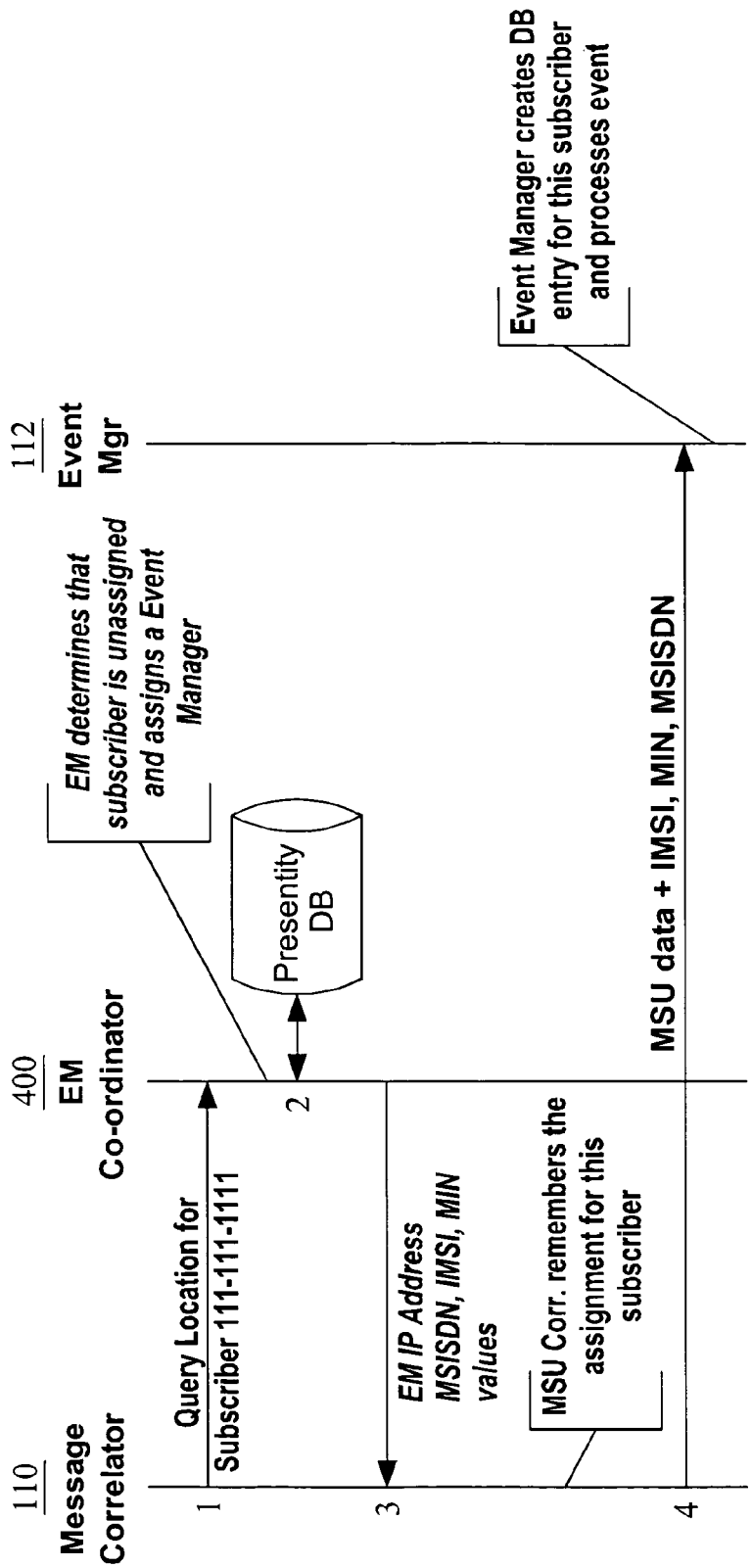
FIG. 9 is a message flow diagram illustrating exemplary messages exchanged between a message correlator, an event manager coordinator, and an event manager in assigning an event manager to a subscriber and delivering presence information to the event manager for a previously unassigned subscriber according to an embodiment of the subject matter described herein.

FIG. 9 is a message flow diagram illustrating the delivery of messages from a message correlator to an event manager according to an embodiment of the subject matter described herein. Referring to FIG. 9, in line 1 of the message flow diagram, message correlator 110 queries event manager coordinator 400 for the location of a subscriber corresponding to the directory number 111-111-1111. In line 2 of the message flow diagram, event manager coordinator 400 determines that the subscriber is unassigned and assigns an event manager. In line 3 of the message flow diagram, event manager coordinator 400 sends the event manager IP address, IMSI, MSISDN, and MIN values to the querying message correlator. Message correlator 110 preferably remembers the assignment for this subscriber. In line 4 of the message flow diagram, event manager coordinator 400 sends message data and the IMSI, MIN, and MSISDN number directly to event manager 112. Event manager 112 creates a database entry for the subscriber and processes the event. For example, event manager coordinator may determine whether the message data indicates a change in status for a subscribed-to presentity. If the message data indicates a change in presence status regarding a subscribed-to presentity, event manager 112 may inform a presence server of the new presence status for the subscribed-to presentity.

Figure 10:
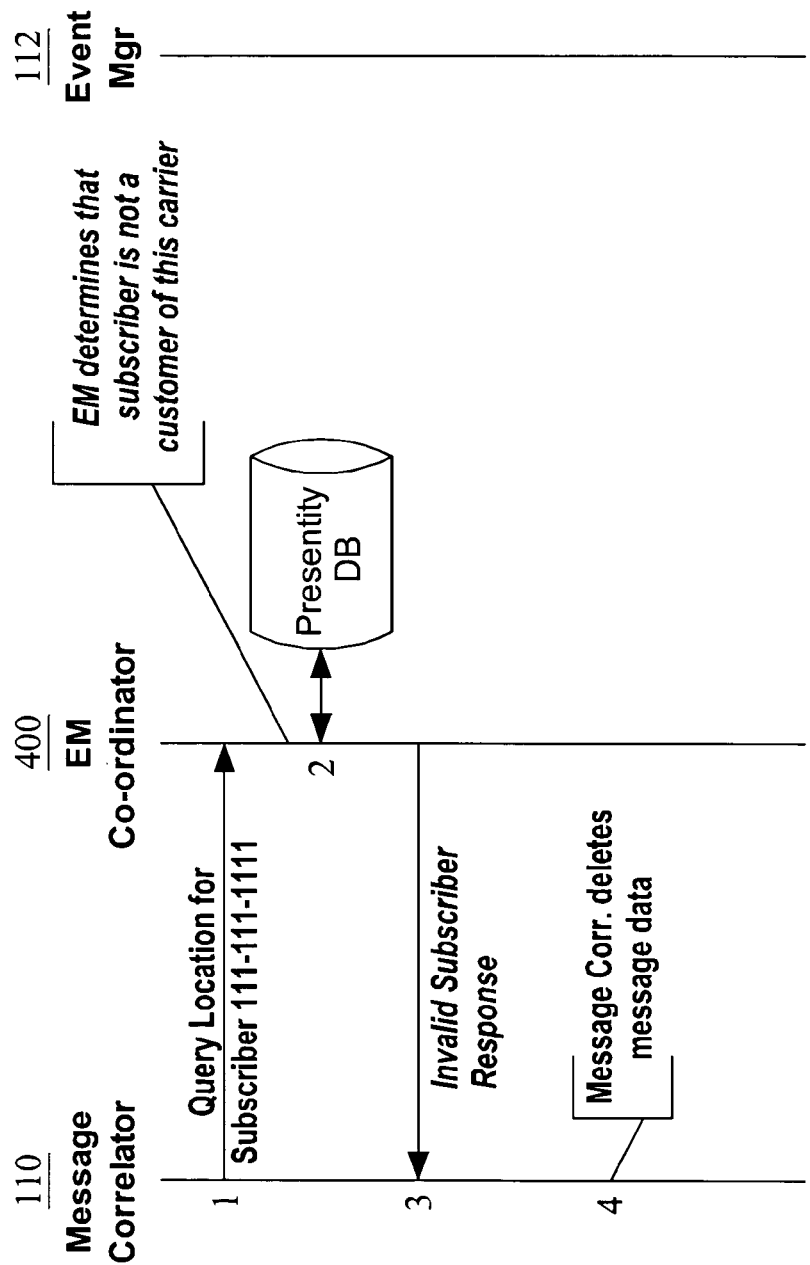
FIG. 10 is a message flow diagram illustrating exemplary messages exchanged between a message correlator, an event manager coordinator, and an event manager for a subscriber for whom presence information is not collected according to an embodiment of the subject matter described herein.

FIG. 10 is a message flow diagram illustrating exemplary steps for notifying a message correlator that an event manager is not a subscriber of a particular network. Referring to FIG. 10, in line 1, message correlator 110 queries event manager coordinator 400 for the location of a subscriber corresponding to the subscriber identifier 111-111-1111. In line 2 of the message flow diagram, event manager coordinator 400 queries its presentity database and determines that the subscriber is not a subscriber or customer of the particular carrier. Accordingly, in line 3 of the message flow diagram, event manager coordinator 400 responds with an invalid subscriber message. In line 4 of the message flow diagram, message correlator 110 deletes the message data.

Figure 11:
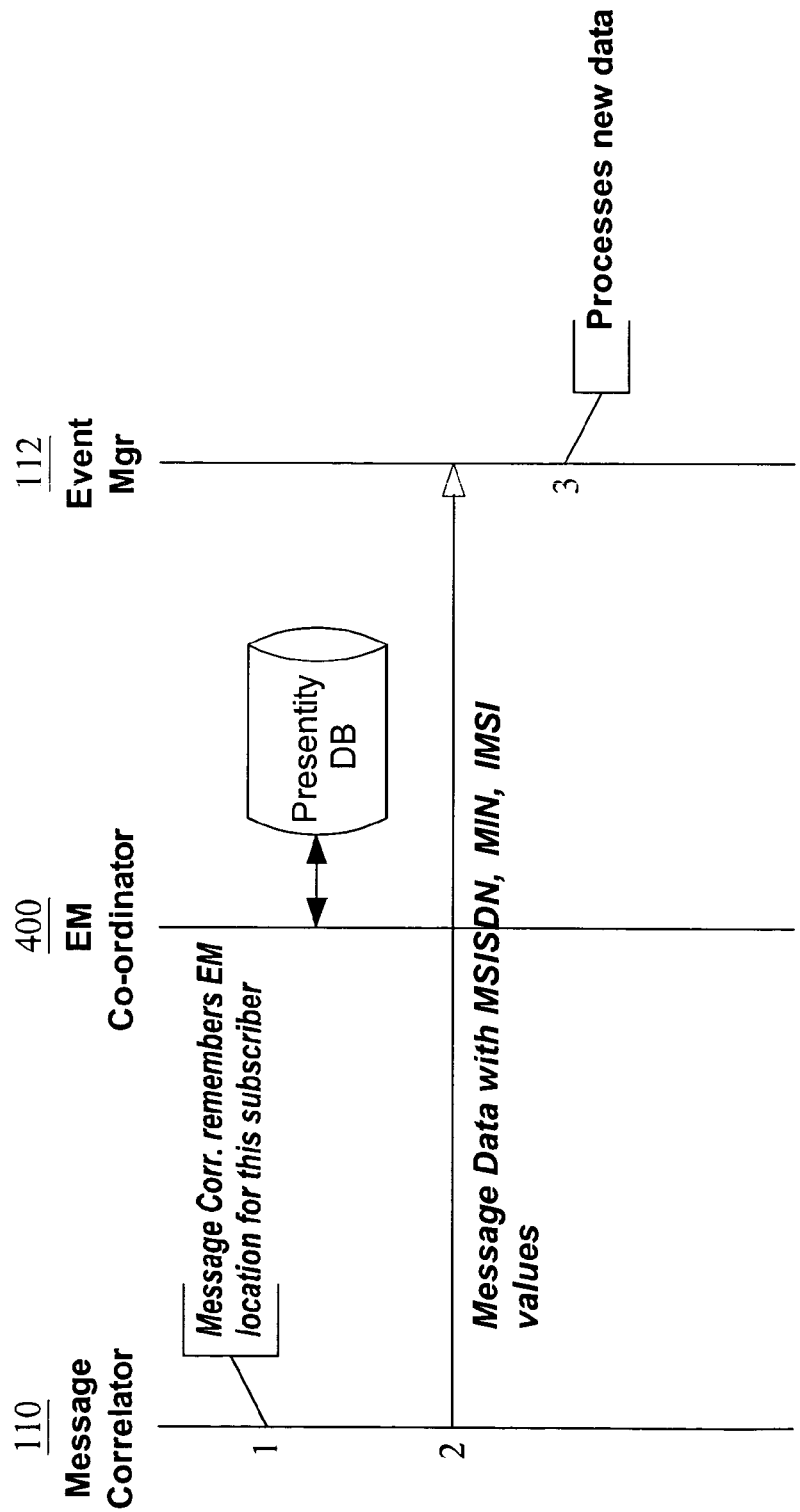
FIG. 11 is a message flow diagram illustrating exemplary messages exchanged between a message correlator, an event manager coordinator, and an event manager for a previously assigned subscriber according to an embodiment of the subject matter described herein.

FIG. 11 is a message flow diagram illustrating exemplary messages exchanged in communicating messages containing presence status information for a presentity to an assigned event manager. Referring to FIG. 11, in line 1, message correlator 110 determines presence information needs to be delivered to an event manager and remembers the event manager location for the particular subscriber. This step may be performed after a previous location query for the same subscriber. In line 2 of the message flow diagram, message correlator 110 sends the message data directly to event manager 112, bypassing event manager coordinator 400. In line 3 of the message flow diagram, event manager 112 processes the new data. Accordingly, FIG. 11 illustrates that by caching event manager assignment information, message correlators 110 can reduce the flow of query messages in the network.

Figure 12:
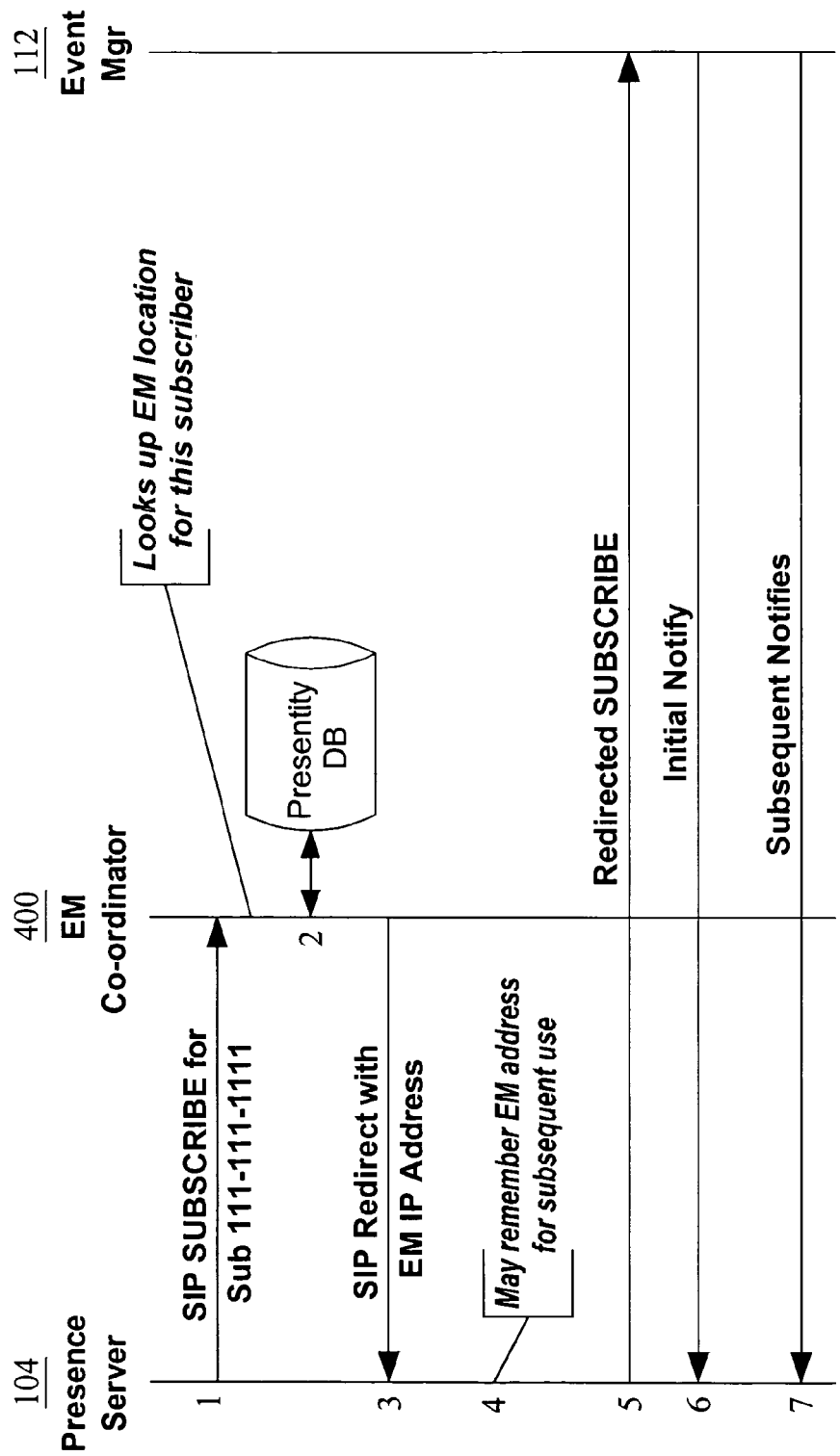
FIG. 12 is a message flow diagram illustrating exemplary messages exchanged between a presence server, an event manager coordinator, and an event manager in subscribing to presentity data maintained by the event manager according to an embodiment of the subject matter described herein.

FIG. 12 is a message flow diagram illustrating exemplary messages exchanged between a presence server and an event manager coordinator in subscribing to presentity data stored by an event manager. Referring to FIG. 12, in line 1, presence server 104 sends a SIP subscribe message to event manager coordinator 400. The SIP subscribe message requests presence information regarding a subscriber corresponding to subscriber identifier 111-111-1111. In line 2 of the message flow diagram, event manager coordinator 400 looks up the event manager location for the subscriber. In line 3 of the message flow diagram, event manager coordinator sends a SIP redirect message to presence server 104 redirecting the presence server to the event manager assigned to the subscriber. In an alternate scenario, the event manager coordinator could proxy the subscribe message to the correct event manager. The 200 OK response from the event manager would contain its address information which the presence server may then remember for future direct communications. This eliminates the need for the extra subscribe sent at line 5.

In line 4 of the message flow diagram, presence server 104 may remember the event manager address for subsequent use. In line 5 of the message flow diagram, presence server 104 sends a redirected subscribe message to the event manager assigned to the subscriber. In line 6 of the message flow diagram, event manager 112 sends a notify message containing presence information regarding the subscriber to presence server 104. Event manager 112 may send subsequent notifies to the subscribing presence server when subscriber's presence status changes.

As a number of subscribers in a network increases, it may be desirable to add event manager nodes. Once event manager nodes are added, there must be some mechanism for allocating subscribers to each newly added event manager. Once possible solution is to keep existing subscribers with their current event managers and start using the new event manager for new subscribers. This could be accomplished relatively easily because event manager coordinator 400 may be configured to automatically assign subscribers to the least busy event manager as described above. Since the new event manager is initially unutilized, new subscribers will be allocated to that event manager until its utilization level becomes equal to that of the existing event managers.

In an alternate implementation, existing subscribers may be rebalanced among event managers when a new event manager is added. Rebalancing or reassigning existing subscribers to new event managers may include copying current presence information from a source event manager to a new event manager, informing the presence server that the subscriber has moved, informing all message correlators that the subscriber has moved, and deleting presence information from the old event manager. Copying presence information may include selecting subscribers to be reassigned based on arithmetic formula designed to equally distribute subscribers over the total number of event managers. Informing the presence servers of new assignments may include determining if there are any active subscriptions for the reassigned presentity and sending a notify message to each presence server that is subscribed to the presentity. The notify message preferably has a subscription state header value of terminated and a reason code of deactivated, which will cause the presence server to clear the current subscription and immediately attempt a resubscribe message to the event manager coordinator where the presence server will be redirected to the newly assigned event manager location.

Figure 13:
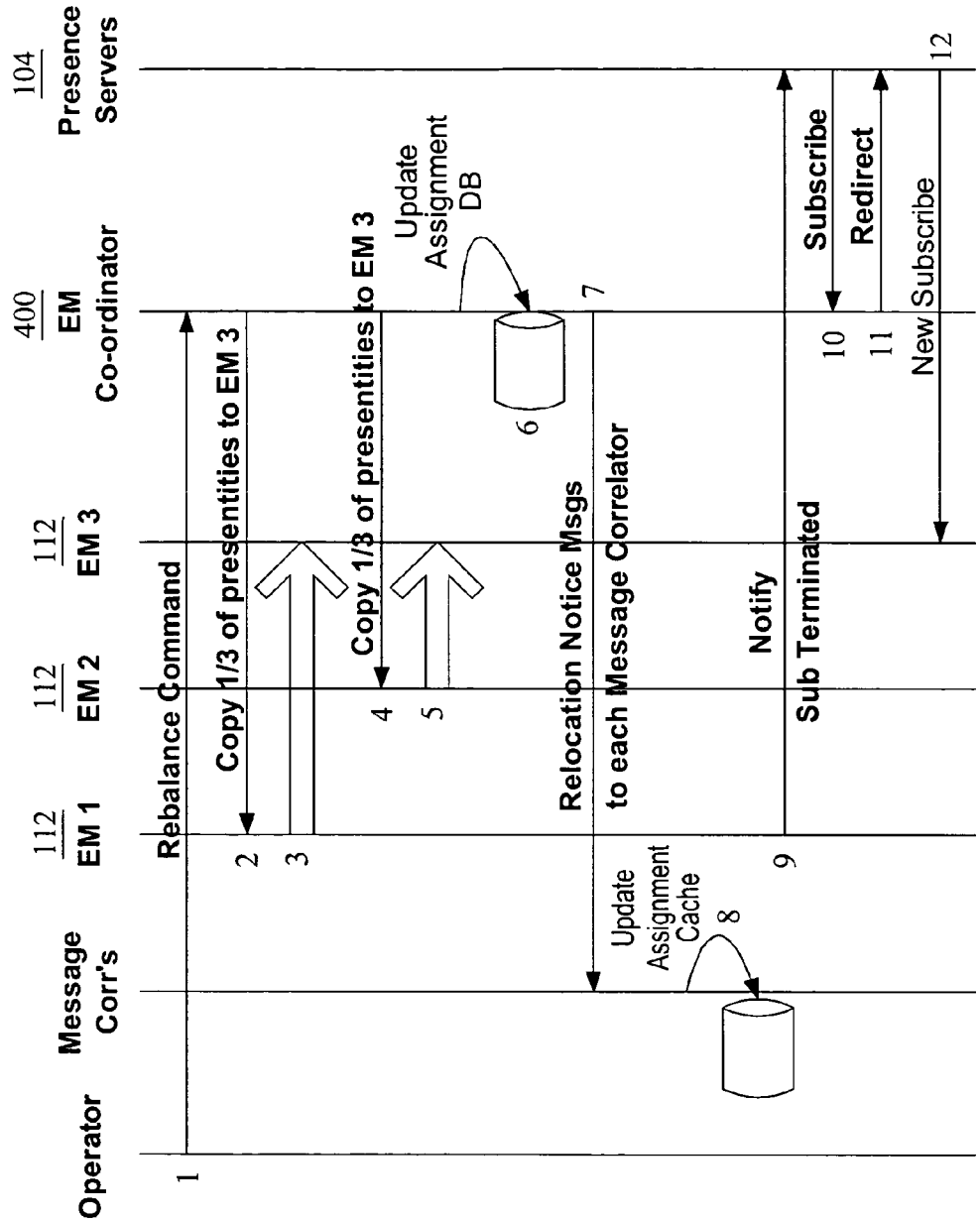
FIG. 13 is a message flow diagram illustrating exemplary messages exchanged between an operator, an event manager coordinator, event managers, and presence servers, in rebalancing the load among existing event managers when a new event manager is added to the network according to an embodiment of the subject matter described herein.

FIG. 13 is a message flow diagram illustrating exemplary messages exchanged in dynamically rebalancing subscribers among event managers when a new event manager is added according to an aspect of the subject matter described herein. Referring to FIG. 13, in line 1 of the message flow diagram, an operator sends a rebalance command to event manager coordinator. In FIG. 13, it is assumed that event manager 3 is newly added. In line 2 of the message flow diagram, event manager coordinator 400 sends a message to event manager 1 indicating that it should copy one third of its presentities to event manager 3. In line 3 of the message flow diagram, event manager 1 copies one third of its presentities to event manager 3.

In line 4 of the message flow diagram, event manager coordinator 400 sends a message to event manager 2 requesting that event manager 2 copy one third of its presentities to event manager 3. In line 5 of the message flow diagram, event manager 2 copies one third of its presentities to event manager 3.

In line 6 of the message flow diagram, event manager coordinator 400 updates its assignment database for the subscribers that have been copied to event manager 3. In line 7 of the message flow diagram, event manager coordinator 400 sends reallocation notification messages to each message correlator. In line 8 of the message flow diagram, each message correlator updates its local assignment cache to indicate the event manager to which it should send messages. In line 9 of the message flow diagram, each event manager 112 from which subscribers were transferred (EM1 and EM2) sends a notify message to the presence servers indicating that the subscriptions for the transferred subscribers have been terminated. In line 10 of the message flow diagram, the presence server subscribes to these subscribers. In line 11 of the message flow diagram, event manager coordinator 400 redirects the presence servers to the event manager to which the subscribers have been moved. In line 12 of the message flow diagram, the presence servers subscribe to the event managers to which they were redirected.

Thus, the subject matter described herein includes methods, systems, and computer program products for dynamically coordinating the collection and distribution of presence information. The subject matter described herein can be used to coordinate the collection of presence information by any number of event managers and the distribution of that information to any number of presence servers. As a result, presence gateway architectures can be scaled as the number of subscribers increases.

In the examples described above, the event manager coordinator dynamically assigns event managers to subscriber records and communicates the event manager identity to message correlators and to presence servers. Communicating event manager identities to message correlators is useful in 2 G and 2.5 G networks where presence information is derived from signaling messages. However, the subject matter described herein is not limited to coordinating the collection and distribution of presence information in 2 G and 2.5 G networks. For example, a presence gateway coordinator according to an embodiment of the subject matter described herein may also be capable of coordinating the collection and distribution of presence information in 3 G networks and in networks that use 2 G, 2.5 G, and 3 G methods for collecting presence information.

In 3 G networks, some GPRS handsets include presence clients that collect presence information regarding their respective users. Each handset may be programmed with the location of an event manager coordinator from which the handset requests the location of an assigned event manager. The presence gateway coordinator may inform the handset of the location of the event manager in the manner described above. The handset may then deliver its presence information to the assigned event manager.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for dynamically coordinating collection and distribution of presence information, the method comprising:
    (a) collecting presence information regarding a presentity, wherein collecting presence information regarding a presentity includes correlating, at a message correlator, signaling messages regarding a presentity and deriving presence information from the correlated signaling messages, wherein the presence information includes information indicating the availability of the presentity via one or more telecommunications contact modes, wherein the presentity includes a telecommunications services subscriber;
    (b) dynamically assigning a presence gateway event manager from a plurality of presence gateway event managers to the presentity in response to receiving a subscription request regarding the presentity from a presence server; and
    (c) transmitting the presence information regarding the presentity to the assigned event manager.

2. The method of claim 1 wherein dynamically assigning a presence gateway event manager to the subscriber includes maintaining event manager resource utilization information regarding the event managers, assigning an event manager to the presentity based on the resource utilization information, and informing the message correlator of the assigned event manager.

3. The method of claim 2 comprising caching presence gateway event manager identification information for the presentity at the message correlator.

4. The method of claim 3 comprising, at the message correlator, sending the presence information regarding the presentity to the event manager using the cached location information.

5. The method of claim 1 wherein collecting presence information includes collecting presence information from a general packet radio service (GPRS) handset.

6. The method of claim 1 wherein dynamically assigning a presence gateway event manager includes:
    (a) receiving the subscription request from the presence server;
    (b) determining whether the presentity is currently assigned to an event manager; and
    (c) in response to determining that the presentity is not assigned to an event manager, assigning an event manager, and redirecting the presence server to the assigned event manager.

7. The method of claim 6 wherein redirecting the presence server to the event manager includes sending a SIP redirect message to the presence server.

8. The method of claim 7 comprising, at the presence server, after receiving the redirect message, sending a subscription request to the assigned event manager.

9. The method of claim 6 wherein redirecting the presence server to the assigned event manager includes proxying the subscription request to the assigned event manager.

10. The method of claim 6 comprising caching the event manager identity at the presence server and using the cached event manager identity to obtain presence information regarding the presentity from the event manager.

11. A method for rebalancing subscribers among presence gateway event managers, the method comprising:
    (a) providing a first presence gateway event manager for storing subscriber records including presence information for a plurality of telecommunications services subscribers and for communicating the presence information to a presence server, wherein the presence information includes information indicating the availability of each of the telecommunications services subscribers via one or more telecommunications contact modes;
    (b) adding a second presence gateway event manager to a network;
    (c) dynamically allocating subscriber records to the second presence gateway event manager; and
    (d) sending, to each of a plurality of message correlators configured to derive the presence information from received signaling messages associated with the telecommunications services subscribers, a reallocation notification message that indicates that subsequently collected presence information associated with the allocated subscriber records is to be sent to the second presence gateway event manager instead of the first presence gateway event manager.

12. The method of claim 11 wherein dynamically allocating subscriber records to the second present gateway event manager comprises allocating new subscriber records to the first or second present gateway event managers based on relative resource utilization of the first and second presence gateway event managers.

13. The method of claim 11 wherein dynamically allocating subscriber records to the second presence gateway event manager includes transferring at least some of the subscriber records from the first presence gateway event manager to the second presence gateway event manager.

14. The method of claim 13 comprising, after transferring the subscriber records from the first presence gateway event manager to the second presence gateway event manager, notifying a presence server of the transferred subscriber records.

15. A method for rebalancing subscribers among presence gateway event managers, the method comprising:
   (a) providing a first presence gateway event manager for storing subscriber records including presence information for a plurality of telecommunications services subscribers and for communicating the presence information to a presence server, wherein the presence information includes information indicating the availability of each of the telecommunications services subscribers via one or more telecommunications contact modes;
   (b) adding a second presence gateway event manager to a network;
   (c) dynamically allocating subscriber records to the second presence gateway event manager, wherein dynamically allocating subscriber records to the second presence gateway event manager includes transferring at least some of the subscriber records from the first presence gateway event manager to the second presence gateway event manager; and
   (d) after transferring the subscriber records from the first presence gateway event manager to the second presence gateway event manager, notifying a presence server of the transferred subscriber records, wherein notifying a presence server of the transferred subscriber records includes terminating presence server subscriptions to the transferred subscriber records, receiving subscribe messages from the presence server for the transferred subscriber records, redirecting the presence server to the second presence gateway event manager, and receiving new subscribe messages regarding the transferred subscriber records from the presence server at the second presence gateway event manager.

16. A system for dynamically coordinating collection and distribution of presence information, the system comprising:
   (a) a correlator for correlating telecommunications signaling messages regarding a presentity and deriving presence information regarding the presentity based on the telecommunications signaling messages, wherein the presence information includes information indicating the availability of the presentity via one or more telecommunications contact modes, wherein the presentity includes a telecommunications services subscriber;
   (b) a plurality of event managers for receiving presence information from the correlator; and
   (c) an event manager coordinator for dynamically assigning one of the event managers for receiving the presence information regarding the presentity.

17. The system of claim 16 wherein the correlator is adapted to correlate SS7 signaling messages regarding the presentity.

18. The system of claim 16 wherein the correlator is adapted to correlate IP telephony signaling messages regarding the presentity.

19. The system of claim 16 wherein the event managers are adapted to communicate resource utilization data to the event manager coordinator and wherein the event manager coordinator is adapted to utilize relative resource utilization data in assigning the event manager to the presentity.

20. The system of claim 16 wherein the event manager coordinator is adapted to dynamically assign the event manager based on request message from the correlator.

21. The system of claim 16 wherein the event manager is adapted to dynamically assign the event manager based on a subscription message from a presence server.

22. A computer program product comprising computer-executable instructions embodied in a non-transitory computer-readable storage medium for performing steps comprising:
   (a) collecting presence information for a presentity, wherein collecting presence information includes correlating, at a message correlator, telecommunications signaling messages regarding a presentity and deriving presence information from the correlated telecommunications signaling messages, wherein the presence information includes information indicating the availability of the presentity via one or more telecommunications contact modes, wherein the presentity includes a telecommunications subscriber;
   (b) dynamically assigning a presence gateway event manager from a plurality of presence gateway event managers to the presentity in response to receiving a subscription request regarding the presentity from a presence server; and
   (c) transmitting presence information regarding the presentity to the assigned event manager.

23. The computer program product of claim 22 wherein dynamically assigning a presence gateway event manager to the subscriber includes maintaining event manager resource utilization information regarding the event managers, assigning an event manager to the presentity based on the resource utilization information, and informing the message correlator of the assigned event manager.

24. The computer program product of claim 23 comprising caching presence gateway event manager identification information for the presentity at the message correlator.

25. The computer program product of claim 23 comprising, at the message correlator, sending the presence information regarding the presentity to the event manager using the cached location information.

26. The computer program product of claim 22 wherein collecting presence information includes collecting presence information from a general packet radio service (GPRS) handset.

27. The computer program product of claim 22 wherein dynamically assigning a presence gateway event manager includes:
   (a) receiving the subscription request from the presence server;
   (b) determining whether the presentity is currently assigned to an event manager; and
   (c) in response to determining that the presentity is not assigned to an event manager, assigning an event manager, and redirecting the presence server to the assigned event manager.

28. The computer program product of claim 27 wherein redirecting the presence server to the event manager includes sending a SIP redirect message to the presence server.

29. The computer program product of claim 28 comprising, at the presence server, after receiving the redirect message, sending a subscription request to the event manager.

30. The computer program product of claim 27 wherein redirecting the presence server to the event manager includes proxying the subscription request to assigned event manager.

31. The computer program product of claim 27 comprising caching the event manager identity at the presence server and using the cached event manager identity to obtain presence information regarding the presentity from the event manager.

32. A computer program product comprising computer-executable instructions embodied in a non-transitory computer-readable storage medium for performing steps comprising:
 (a) providing a first presence gateway event manager for storing subscriber records including presence information for a plurality of telecommunications services subscribers and for communicating the presence information to a presence server, wherein the presence information includes information indicating the availability of each of the telecommunications services subscribers via one or more telecommunications contact modes;
 (b) adding a second presence gateway event manager to a network;
 (c) dynamically allocating subscriber records to the second presence gateway event manager; and
 (d) sending, to each of a plurality of message correlators configured to derive the presence information from received signaling messages associated with the telecommunications services subscribers, a reallocation notification message that indicates that subsequently collected presence information associated with the allocated subscriber records is to be sent to the second presence gateway event manager instead of the first presence gateway event manager.

33. The computer program product of claim 32 wherein dynamically allocating subscriber records to the second present gateway event manager comprises allocating new subscriber records to the first or second present gateway event managers based on relative resource utilization of the first and second presence gateway event managers.

34. The computer program product of claim 32 wherein dynamically allocating subscriber records to the second presence gateway event manager includes transferring at least some of the subscriber records from the first presence gateway event manager to the second presence gateway event manager.

35. The computer program product of claim 34 comprising, after transferring the subscriber records from the first presence gateway event manager to the second presence gateway event manager, notifying a presence server of the transferred subscriber records.

36. A computer program product comprising computer-executable instructions embodied in a non-transitory computer-readable storage medium for performing steps comprising:
 (a) providing a first presence gateway event manager for storing subscriber records including presence information for a plurality of telecommunications services subscribers and for communicating the presence information to a presence server, wherein the presence information includes information indicating the availability of each of the telecommunications services subscribers via one or more telecommunications contact modes;
 (b) adding a second presence gateway event manager to a network;
 (c) dynamically allocating subscriber records to the second presence gateway event manager, wherein dynamically allocating subscriber records to the second presence gateway event manager includes transferring at least some of the subscriber records from the first presence gateway event manager to the second presence gateway event manager; and
 (d) after transferring the subscriber records from the first presence gateway event manager to the second presence gateway event manager, notifying a presence server of the transferred subscriber records, wherein notifying a presence server of the transferred subscriber records includes terminating presence server subscriptions to the transferred subscriber records, receiving subscribe messages from the presence server for the transferred subscriber records, redirecting the presence server to the second presence gateway event manager, and receiving new subscribe messages regarding the transferred subscriber records from the presence server at the second presence gateway event manager.

* * * * *